United States Patent
Tanne et al.

(10) Patent No.: US 11,977,554 B2
(45) Date of Patent: *May 7, 2024

(54) METHODS OF AND SYSTEMS FOR SEARCHING BY INCORPORATING USER-ENTERED INFORMATION

(71) Applicant: Pinterest, Inc., San Francisco, CA (US)

(72) Inventors: Michael Tanne, Los Altos, CA (US); Yunshan Lu, Palo Alto, CA (US); Bruce D. Karsh, Half Moon Bay, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,597

(22) Filed: May 16, 2023

(65) Prior Publication Data

US 2023/0289356 A1    Sep. 14, 2023

Related U.S. Application Data

(63) Continuation of application No. 17/732,407, filed on Apr. 28, 2022, now Pat. No. 11,693,864, which is a
(Continued)

(51) Int. Cl.
*G06F 16/00* (2019.01)
*G06F 3/0482* (2013.01)
(Continued)

(52) U.S. Cl.
CPC ...... *G06F 16/24578* (2019.01); *G06F 3/0482* (2013.01); *G06F 16/3326* (2019.01);
(Continued)

(58) Field of Classification Search
CPC ............. G06F 16/24578; G06F 3/0482; G06F 16/3326; G06F 16/951; G06F 16/9535; G06F 16/9538; G06F 40/134
See application file for complete search history.

(56) References Cited

U.S. PATENT DOCUMENTS 5,680,511 A    10/1997  Baker et al.
5,694,544 A    12/1997  Tanigawa et al.
(Continued)

FOREIGN PATENT DOCUMENTS

JP    H0816514 A    1/1996
JP    H0944523 A    2/1997
(Continued)

OTHER PUBLICATIONS

Claire Cardie, "Empirical Methods in Information Extraction", AI Magazine, Winter 1997, pp. 65-79, vol. 18, No. 4.
(Continued)

*Primary Examiner* — Noosha Arjomandi
(74) *Attorney, Agent, or Firm* — Athorus, PLLC

(57) ABSTRACT

A system for and a method of using user-entered information to return more meaningful information in response to Internet search queries are disclosed. A method in accordance with the disclosed subject matter comprises managing a database in response to multiple user inputs and displaying search results from the database in response to a search query. The search results include a results list and supplemental data related to the search query. Managing the database includes, among other things, re-ranking elements in the results list, storing information related to relevancies of elements in the results list, blocking a link in the results list, storing links to documents related to the search query, or any combination of these. The supplemental data include descriptions of or indices to one or more concepts related to the search query.

20 Claims, 4 Drawing Sheets

Related U.S. Application Data continuation of application No. 16/387,277, filed on Apr. 17, 2019, now Pat. No. 11,341,144, which is a continuation of application No. 15/144,604, filed on May 2, 2016, now Pat. No. 10,311,068, which is a continuation of application No. 14/746,696, filed on Jun. 22, 2015, now Pat. No. 9,355,178, which is a continuation of application No. 11/364,617, filed on Feb. 27, 2006, now Pat. No. 9,092,523.

(60) Provisional application No. 60/657,371, filed on Feb. 28, 2005.

(51) Int. Cl.
*G06F 16/2457* (2019.01)
*G06F 16/332* (2019.01)
*G06F 16/951* (2019.01)
*G06F 16/9535* (2019.01)
*G06F 16/9538* (2019.01)
*G06F 40/134* (2020.01)

(52) U.S. Cl.
CPC ........ *G06F 16/951* (2019.01); *G06F 16/9535* (2019.01); *G06F 16/9538* (2019.01); *G06F 40/134* (2020.01)

(56) References Cited

U.S. PATENT DOCUMENTS

| | | |
|---|---|---|
| 5,835,712 A | 11/1998 | DuFresne |
| 5,899,972 A | 5/1999 | Miyazawa et al. |
| 5,991,735 A | 11/1999 | Gerace |
| 6,029,195 A | 2/2000 | Herz |
| 6,070,176 A | 5/2000 | Downs et al. |
| 6,256,622 B1 | 7/2001 | Howard, Jr. et al. |
| 6,324,566 B1 | 11/2001 | Himmel et al. |
| 6,327,590 B1 | 12/2001 | Chidlovskii et al. |
| 6,360,215 B1 | 3/2002 | Judd et al. |
| 6,601,075 B1 | 7/2003 | Huang et al. |
| 6,714,929 B1 | 3/2004 | Micaelian et al. |
| 6,718,365 B1 | 4/2004 | Dutta |
| 6,775,664 B2 | 8/2004 | Lang et al. |
| 6,823,491 B1 | 11/2004 | McBrearty et al. |
| 6,829,599 B2 | 12/2004 | Chidlovskii |
| 7,032,030 B1 | 4/2006 | Codignotto |
| 7,039,596 B1 | 5/2006 | Lu |
| 7,181,438 B1* | 2/2007 | Szabo ............... G06Q 30/0269 705/14.27 |
| 7,188,117 B2 | 3/2007 | Farahat et al. |
| 7,191,175 B2 | 3/2007 | Evans |
| 7,225,189 B1 | 5/2007 | McCormack et al. |
| 7,283,997 B1 | 10/2007 | Howard et al. |
| 7,333,943 B1 | 2/2008 | Charuk et al. |
| 7,363,593 B1 | 4/2008 | Loyens et al. |
| 7,370,276 B2 | 5/2008 | Willis |
| 7,395,259 B2 | 7/2008 | Bailey et al. |
| 7,428,505 B1 | 9/2008 | Levy et al. |
| 7,590,619 B2 | 9/2009 | Hurst-Hiller et al. |
| 7,668,821 B1 | 2/2010 | Donsbach et al. |
| 7,756,855 B2 | 7/2010 | Ismalon |
| 7,890,501 B2 | 2/2011 | Lunt et al. |
| 8,082,247 B2* | 12/2011 | Kumthekar ........ G06F 16/9535 707/727 |
| 8,375,048 B1 | 2/2013 | Wad et al. |
| 8,402,026 B2 | 3/2013 | Gallivan |
| 8,688,704 B1* | 4/2014 | Horling ................ G06F 16/355 707/706 |
| 8,775,426 B2 | 7/2014 | Mukerjee et al. |
| 10,311,068 B2 | 6/2019 | Tanne et al. |
| 10,740,412 B2 | 8/2020 | Bhat et al. |
| 11,341,144 B2* | 5/2022 | Tanne ................ G06F 3/0482 |
| 2002/0073065 A1 | 6/2002 | Inaba et al. |
| 2002/0120609 A1 | 8/2002 | Lang et al. |
| 2002/0129014 A1 | 9/2002 | Kim et al. |
| 2002/0156779 A1 | 10/2002 | Elliott et al. |
| 2002/0165856 A1 | 11/2002 | Gilfillan et al. |
| 2002/0169650 A1* | 11/2002 | Dougherty ............ G06Q 30/02 705/38 |
| 2003/0041054 A1 | 2/2003 | Mao et al. |
| 2003/0046098 A1 | 3/2003 | Kim |
| 2003/0078914 A1 | 4/2003 | Witbrock |
| 2003/0115269 A1 | 6/2003 | Klug |
| 2003/0161285 A1 | 8/2003 | Tiedemann et al. |
| 2003/0212663 A1 | 11/2003 | Leno et al. |
| 2004/0024755 A1 | 2/2004 | Rickard |
| 2004/0030697 A1 | 2/2004 | Cochran et al. |
| 2004/0068486 A1 | 4/2004 | Chidlovskii |
| 2004/0083127 A1 | 4/2004 | Lunsford et al. |
| 2004/0117354 A1 | 6/2004 | Azzaro et al. |
| 2004/0133342 A1 | 7/2004 | Banker |
| 2004/0176133 A1 | 9/2004 | Lipsit |
| 2004/0215608 A1 | 10/2004 | Gourlay |
| 2004/0254917 A1 | 12/2004 | Brill et al. |
| 2005/0033771 A1 | 2/2005 | Schmitter et al. |
| 2005/0060210 A1 | 3/2005 | Levi et al. |
| 2005/0071325 A1 | 3/2005 | Bem |
| 2005/0071328 A1 | 3/2005 | Lawrence |
| 2005/0076068 A1 | 4/2005 | Fowler et al. |
| 2005/0097188 A1 | 5/2005 | Fish |
| 2005/0102259 A1 | 5/2005 | Kapur |
| 2005/0131866 A1 | 6/2005 | Badros et al. |
| 2005/0144162 A1 | 6/2005 | Liang |
| 2005/0149473 A1 | 7/2005 | Weare |
| 2005/0149496 A1* | 7/2005 | Mukherjee ........ G06F 16/24575 |
| 2005/0149499 A1 | 7/2005 | Franz et al. |
| 2005/0234972 A1 | 10/2005 | Zeng et al. |
| 2005/0256866 A1 | 11/2005 | Lu et al. |
| 2005/0262062 A1 | 11/2005 | Xia |
| 2005/0289120 A9 | 12/2005 | Soulanille et al. |
| 2005/0289133 A1 | 12/2005 | Arrouye et al. |
| 2006/0004748 A1 | 1/2006 | Ramarathnam et al. |
| 2006/0047643 A1 | 3/2006 | Chaman |
| 2006/0069561 A1 | 3/2006 | Beattie et al. |
| 2006/0136377 A1 | 6/2006 | Patt-Shamir et al. |
| 2006/0170705 A1 | 8/2006 | Wilson |
| 2006/0173880 A1 | 8/2006 | Alberts et al. |
| 2006/0221190 A1 | 10/2006 | Limberis et al. |
| 2006/0242139 A1 | 10/2006 | Butterfield et al. |
| 2006/0251292 A1 | 11/2006 | Gokturk et al. |
| 2006/0251338 A1 | 11/2006 | Gokturk et al. |
| 2006/0271524 A1* | 11/2006 | Tanne ................ G06F 16/3326 |
| 2007/0011154 A1 | 1/2007 | Musgrove et al. |
| 2007/0106659 A1 | 5/2007 | Lu et al. |
| 2007/0112758 A1 | 5/2007 | Livaditis |
| 2007/0112761 A1 | 5/2007 | Xu et al. |
| 2007/0185858 A1 | 8/2007 | Lu et al. |
| 2007/0287473 A1 | 12/2007 | Dupray |
| 2008/0059455 A1* | 3/2008 | Canoy .................... G06Q 10/10 707/999.005 |
| 2008/0109881 A1 | 5/2008 | Dasdan |
| 2009/0089272 A1 | 4/2009 | Oliver et al. |
| 2009/0144264 A1 | 6/2009 | Singh et al. |
| 2009/0193352 A1 | 7/2009 | Bunn |
| 2012/0005182 A1 | 1/2012 | Monteverde |
| 2012/0109830 A1* | 5/2012 | Vogel .................... G06Q 30/06 705/64 |
| 2013/0144889 A1 | 6/2013 | Gupta et al. |
| 2013/0226925 A1* | 8/2013 | Carbonell ............ G06F 16/345 707/E17.069 |
| 2013/0268532 A1 | 10/2013 | Doshi |
| 2014/0280551 A1 | 9/2014 | Real et al. |
| 2015/0149432 A1 | 5/2015 | Hart et al. |
| 2015/0339405 A1 | 11/2015 | Vora et al. |
| 2016/0055162 A1 | 2/2016 | Woolf |
| 2016/0275194 A1 | 9/2016 | Borza et al. |
| 2017/0116197 A1* | 4/2017 | Cameron ............ G06F 16/285 |
| 2017/0116198 A1* | 4/2017 | Cameron ............ G06F 16/9535 |
| 2018/0083901 A1* | 3/2018 | McGregor, Jr. .......... H04L 51/02 |
| 2019/0236202 A1* | 8/2019 | Guney ................ G06F 16/9535 |
| 2019/0243839 A1 | 8/2019 | Tanne et al. |
| 2022/0253451 A1* | 8/2022 | Tanne ................ G06F 16/3326 |

(56) References Cited

U.S. PATENT DOCUMENTS

FOREIGN PATENT DOCUMENTS

| JP | H09153051 A | 6/1997 |
|---|---|---|
| JP | H10134075 A | 5/1998 |
| JP | 2000222427 A | 8/2000 |
| JP | 2001052003 A | 2/2001 |
| JP | 2001350794 A | 12/2001 |
| JP | 2002334107 A | 11/2002 |
| JP | 2004013323 A | 1/2004 |
| KR | 20020015838 A | 3/2002 |
| TW | 530224 | 5/2003 |
| TW | 548557 | 8/2003 |
| TW | 200422878 A | 11/2004 |
| WO | 9966427 A1 | 12/1999 |
| WO | 2004097568 A3 | 11/2004 |

OTHER PUBLICATIONS

European Search Report of EP Patent Application No. 06736648.4 dated Mar. 8, 2017.
Gerard Salton, "Dynamic Document Processing", Communications of the ACM, Jul. 1972, pp. 658-668, vol. 15, Issue 7, ACM New York, NY, USA.
Girma, Anteneh B., Non-Final Office Action, U.S. Appl. No. 11/378,756, dated Aug. 17, 2009, 33 pages.
Hwee Tou Ng et al., "A Machine Learning Approach to Answering Questions for Reading Comprehension Tests", Dec. 2002, DSO National Laboratories, pp. 124-132.
Jimin Liu et al., "Building Semantic Perceptron Net for Topic Spotting", ACL 2001 Proceedings of the 39th Annual Meeting on Association for Computational Linguistics, Toulouse, France, Jul. 6-11, 2001, pp. 378-385, School of Computing, National University of Singapore, Association for Computational Linguistics, Stroudsburg, PA, USA 2001.
Julian Kupiec et al., "A Trainable Document Summarizer", Xerox Palo Alto Research Center, 6 pages.
K. Sparck Jones et al., "A probabilistic model of information retrieval: development and status", Aug. 1998, 76 pages, Computer Laboratory, University of Cambridge.
Lynette Hirschman et al., "Deep Read: A Reading Comprehension System", ACL 1999 Proceedings of the 37th annual meeting of the Association for Computational Linguistics on Computational Linguistics, Jun. 20-26, 1999, pp. 325-332, The MITRE Corporation, College Park, Maryland.
Richard M. Tong et al., "Conceptual Information Retrieval using RUBRIC", SIGIR 1987 Proceedings of the 10th Annual International ACM SIGIR Conference on Research and Development in Information Retrieval, New Orleans, Louisiana, Jun. 3-5, 1987, pp. 247-253, Advanced Decision Systems, ACM New York, NY, USA 1987.
Search Report and Preliminary Opinion, European Patent Office, dated Sep. 6, 2010, European Patent Application No. 06738810.8, Search Engine Technologies, LLC.
Seiji Yamada et al., Acquiring Meta Information Resource in the WWW, Journal of the Japanese Society for Artificial Intelligence, The Japanese Society for Artificial Intelligence, Mar. 1, 2005, vol. 20, No. 2, pp. 149-156.
Sergey Brin et al., "The Anatomy of a Large-Scale Hypertextual Web Search Engine", Computer Networks and ISDN Systems, 1998, vol. 30, Issues 1-7, pp. 1-26, Computer Science Department, Stanford University.
Stephen Soderland, "Learning Information Extraction Rules for Semi-Structured and Free Text", Machine Learning, 34, 233-272 (1999).
Steve Lawrence & C. Lee Giles, "Accessibility of information on the web", Nature, Jul. 8, 1999, pp. 107-109, vol. 400, Issue 6740.
tripadvisor.com Web site, searching for keywords "Paris", Aug. 18, 2004 (Aug. 18, 2004) from http://web.archive.org/web/20040818035209/http://www.tripadvisor.com/Tourism-g187147-Paris_lle_de_France-Vacations.html (Aug. 18, 2004) (pp. 1-3).
Vladimir Eske "User Profile Management in a Web Search Engine", Computer Science Department Saarland University, Jun. 2004, pp. 1-123.
Wee Meng Soon et al., "Corpus-Based Learning for Noun Phrase Coreference Resolution", Dec. 2000, DSO National Laboratories, pp. 285-291.
Xin Dong et al. "Similarity Search for Web Services," Proceedings of the 30th VLDB Conference, Toronto, Canada (2004), pp. 372-383.
Yiming Yang et al., "A Comparative Study on Feature Selection in Text Categorization", ICML 1997 Proceedings of the Fourteenth International Conference on Machine Learning, Jul. 8-12, 1997, pp. 412-420, Morgan Kaufmann Publishers Inc., San Francisco, CA, USA 1997.
Yiming Yang et al., "A re-examination of text categorization methods", SIGIR 1999 Proceedings of the 22nd Annual International ACM SIGIR Conference on Research and Development in Information Retrieval, Berkeley, California, Aug. 15-19, 1999, pp. 42-49, ACM New York, NY, USA 1999.
Yu Suzuki, "An Automatic Selection Method of Integration Function", Technical Report of IEICE, Japan, The Institute of Electronics, Information and Communication Engineers, Jul. 7, 2004, vol. 104, No. 177, pp. 195-200.

* cited by examiner

Fig. 1

METHODS OF AND SYSTEMS FOR SEARCHING BY INCORPORATING USER-ENTERED INFORMATION

PRIORITY CLAIM

This application claims priority to and is a continuation of U.S. patent application Ser. No. 17/732,407, filed on Apr. 28, 2022 and entitled "Methods of and Systems for Searching by Incorporating User-Entered Information," which claims priority to and is a continuation of U.S. patent application Ser. No. 16/387,277, now U.S. Pat. No. 11,341,144, filed on Apr. 17, 2019 and entitled "Methods of and Systems for Searching by Incorporating User-Entered Information," which claims priority to and is a continuation of U.S. patent application Ser. No. 15/144,604, now U.S. Pat. No. 10,311,068, filed on May 2, 2016 and entitled "Methods of and Systems for Searching by Incorporating User-Entered Information," which claims priority to and is a continuation of U.S. patent application Ser. No. 14/746,696, now U.S. Pat. No. 9,355,178, filed on Jun. 22, 2015 and entitled "Methods of and Systems for Searching by Incorporating User-Entered Information," which claims priority to and is a continuation of U.S. patent application Ser. No. 11/364,617, now U.S. Pat. No. 9,092,523, filed on Feb. 27, 2006 and entitled "Methods of and Systems for Searching by incorporating User-Entered Information," which claims priority to U.S. Provisional Patent Application No. 60/657,371, filed on Feb. 28, 2005 and entitled "Search Engine that incorporates User-Entered Information," all of which are incorporated herein by reference.

FIELD OF THE INVENTION

The disclosed subject matter relates to search engines. More specifically, the disclosed subject matter relates to systems for and methods of searching the Internet by incorporating user-entered information.

BACKGROUND OF THE INVENTION

Internet search engines are designed to locate desired information from among the vast amount of information contained across the Internet. Users describe the information they are looking for by entering queries containing search terms. The search engine matches the search terms against an index of Web pages using a variety of relevance calculations with the objective of identifying those Web pages that are most likely related to the information sought by the users. The search engine then returns a ranked list of hyperlinks to these Web pages, with the links determined to be most relevant nearer the top of the list.

In order to use a search engine, each user must figure out for himself how to construct and enter a query that will cause the search engine to return a results list containing links to sources that will most likely provide the information the user is seeking. Traditionally, searching was done by search experts who were skilled at crafting elaborate and precise Boolean queries. This is a skill that is still in common use at places such as news organizations, libraries and the United States Patent Office. However, on the Internet, most users are unfamiliar with such techniques, and usually enter no more than a few words, with no particular logical expression, hoping the search engine will provide the information they are seeking.

Most search engines today have as an objective of their user interaction design to provide relevant search results without requiring precise queries, by factoring in other evidence about relevance. For example, search engines may analyze the hyperlinks between Web pages, or look for documents that contain terms that are semantically similar to the terms in the query, or demonstrate a high level of co-occurrence with terms in the query over the corpus of documents.

Results returned by search engines can also be manipulated. Web site owners can add content or meta data or hyperlinks from other Web sites to their Web site, so that their Web pages are listed near the top of results lists, even though the Web pages do not contain information that is highly related to a user's query. This practice is often referred to as Search Engine Optimization ("SEO").

Because search techniques have limits and because search engines cannot divine the intent of users in conducting searches, users are often unsatisfied or frustrated with the results returned by search engines. If the user happens to construct a query that yields satisfactory results, there is no mechanism by which he can share that query with other users who wish to do the same or a similar search. Likewise, there is no mechanism for users to review input from others as they attempt to construct queries that will cause the search engine to return the desired results. Search engines do not allow users to learn from one another, or to take advantage of successful searches conducted by one another.

The objective of search engines is not simply to provide lists of links to documents, but ultimately to provide access to the most relevant information to users in response to their queries.

Conventional search engines provide primarily a ranked list of hyperlinks to Web pages that are determined by computer algorithms to be relevant. Users looking for answers to questions about a subject area must follow those hyperlinks and search around on those Web sites for the information they are seeking. Search engines do not return information about the subject, or direct answers to questions in addition to links to Web sites. When, for example, a user enters a query for "Calgary Alberta" the results page does not contain information such as: Location: Lat: 51' 1", Long: 114' 1" and Population: 922,315, in addition to a link to a "City of Calgary" Web page along with the conventional results list.

Additionally, search engines have a difficult time disambiguating between different concepts that can be described by the same query term. For example, the query "star wars" may refer both to the movie "Star Wars" and to the Strategic Defense Initiative. Attempts have been made to develop algorithms such as clustering or semantic analysis in order to determine which concept a user is searching for when he enters a query, but so far with limited success. Often users have knowledge of the concept to which their query pertains. It would be advantageous if those users were able to enter this relevant information to help the search engine disambiguate between that concept and other related concepts. This information would also help other users to understand the concept and assist in the process of searching for information about the concept.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The disclosed subject matter is directed to systems for and methods of receiving inputs from users of search engines to provide better search results to users of the system. In accordance with aspects of the disclosed subject matter, a community of users is able to manage a database from which search results and other information related to searches are generated. Among other things, users are able to vote on the relevance of elements in a result list, add supplemental information such as links to related Web sites, and run other searches using user-entered and computer-generated search terms. In this way, search results are able to provide users with more relevant information.

In a first aspect of the disclosed subject matter, a method comprises managing a database in response to multiple user inputs and displaying search results from the database in response to a first search query. Preferably, the search results include a results list and supplemental data related to the first search query. Managing the database includes any combination of re-ranking elements in the results list, storing information related to relevancies of elements in the results list, blocking a link in the results list, storing links to documents related to the first search query.

In accordance with aspects of the disclosed subject matter, search results are able to be ranked in response to users tagging sites they think are relevant, even if they visit the site outside of the context of a search, or even if they tag it with terms other than the search query in the first search.

In one embodiment, the supplemental data includes a description of a first concept related to the first search query. In another embodiment, managing the database includes any one of adding, editing, and deleting the description of the first concept. In other embodiments, the description of the first concept contains a link to a description of a second concept related to the first concept. In another embodiment, the supplemental data includes an index into a list of concepts related to one or both of the first concept and the second concept. The second concept is any one of a subcategory of the first concept, a co-occurrence of the first concept, and a concept whose occurrence is statistically related to occurrences of the first concept. A relationship between the first concept and the second concept is determined by selecting one of predetermined criteria, user-entered categories, and a statistical relationship.

In another embodiment, the supplemental data includes a link for automatically executing a second search query related to the first search query. A term of the second search query is either input by a user or is determined by a computer. The computer-determined term is derived from any one of its co-occurrence in a document containing a term of the first search query, its location within a document containing a term of the first search query, and a density of its occurrences in a document containing a term of the first search query. In one embodiment, the method also includes using a suspension criterion to suspend an ability of a user to provide user input data.

In a second aspect of the disclosed subject matter, a method comprises submitting a query to a search engine, generating a search results list, retrieving supplemental information related to the query, and displaying a results page containing the search results list and the supplemental information. User input is used to modify at least one of the search results list and the supplemental information.

In a third aspect of the disclosed subject matter, a method of displaying search results in relation to input from first and second users from among multiple users comprises generating first search results in response to a first query, receiving input from the first user, modifying a database in response to the input from the first user, receiving a second query related to the first query, and displaying to the second user second search results generated from the database.

In a fourth aspect of the disclosed subject matter, a system comprises a Web server configured to display search results and supplemental information related to terms of a first search query; a search engine for querying a database and providing a search results list in response to user queries; and a content manager for managing the supplemental information in response to multiple user inputs. Preferably, the system also includes a first data store coupled to the content manager for storing the supplemental information.

In one embodiment, the content manager is configured to receive the multiple user inputs for updating the supplemental information. Preferably, the system also includes a display area for displaying the supplemental information. The supplemental information includes a description of a first concept related to the first search query. The supplemental information includes a link to a description of a second concept. In one embodiment, the content manager is configured to receive the multiple user inputs to add, edit, or delete the link. In another embodiment, the content manager is configured to receive the multiple users input to add, edit, or delete the description of the first concept.

In another embodiment, the system also includes an area that displays links for automatically executing a second search query related to the first search query. Preferably, the system also includes a search engine for organizing the search results based on the multiple user inputs. The search engine is configured to organize the search results based on the multiple user inputs by ranking the search results. The system also includes a user device for executing the Web server. The user device is one of a personal computer, a portable phone, and a personal digital assistant and is configured to communicate with the Web server using any one or more of HyperText Transfer Protocol and Wireless Application Protocol.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 1 is a schematic illustration of a graphical user interface displaying a list of search results incorporating user-entered information in accordance with aspects of the disclosed subject matter;

DETAILED DESCRIPTION

Figure 2:
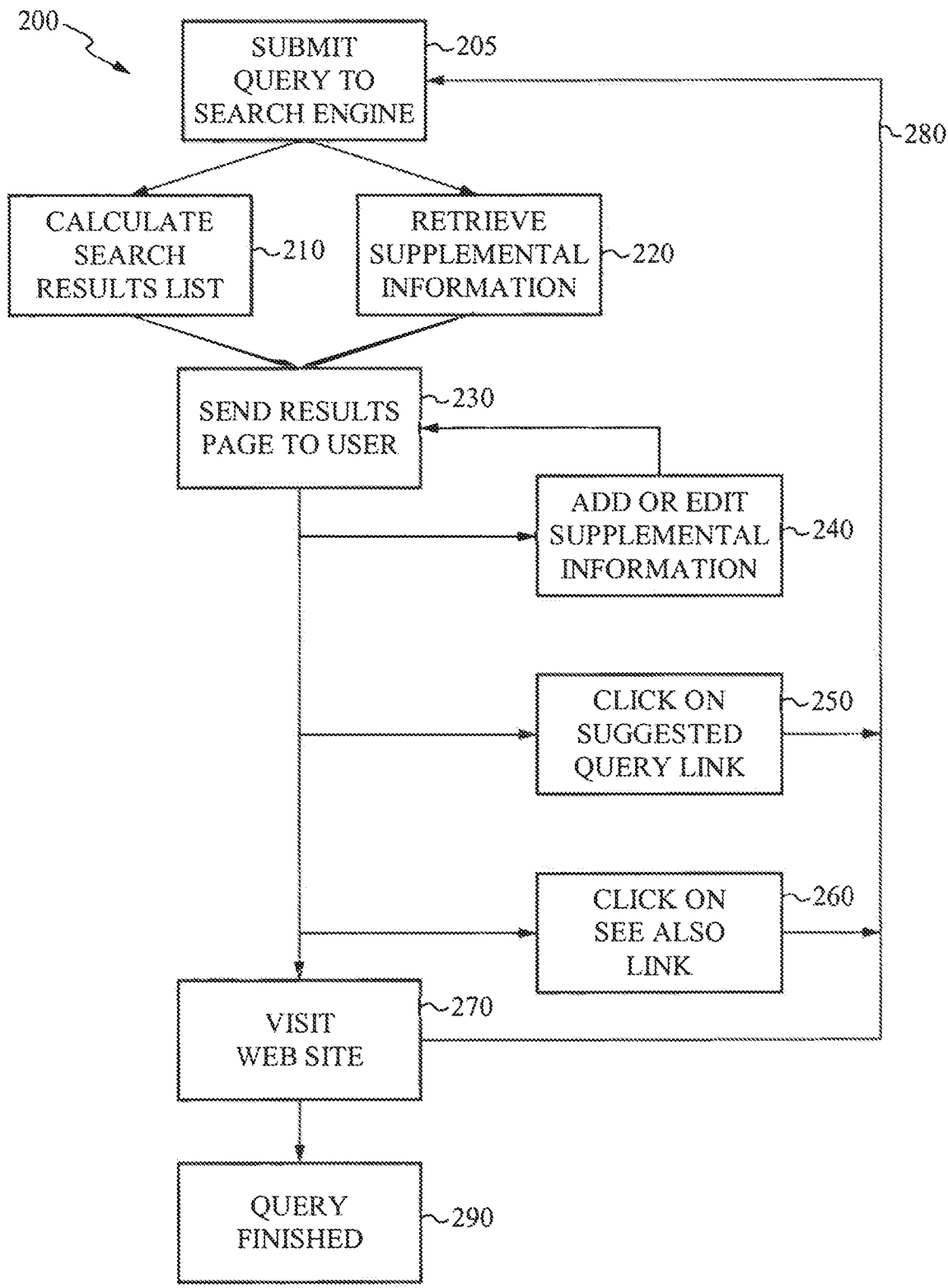
FIG. 2 is a flow diagram illustrating the operation of an Internet search application in accordance with aspects of the disclosed subject matter.

Embodiments of the disclosed subject matter, unlike traditional search engines, make use of supplemental information to provide more relevant information to users searching the Internet, more particularly where this supplemental information is user-entered. For example, in accordance with the disclosed subject matter, a first user performing a search is able to add user-entered information about performing searches for information regarding a concept referenced by the query. The first user is able to enter (1) a description of a concept related to the query, (2) advice for performing a search relating to that concept, (3) "see also" hyperlinks to query terms associated with related concepts, (4) related or suggested query terms, (5) feedback on the relevance of the results to his search, or (6) any other information. Additionally, some or all of this information can be generated by computer algorithms, Web crawlers or other technology. A second user performing a similar or related search is then able to view this supplemental information in addition to a results list provided by the search engine, thereby obtaining search results that are more likely most relevant to him. This second user is also able to add user-entered information. Both users are able to share information related to the subject of the search.

A community of users is thus able to share information that helps users to quickly evaluate and more accurately use and provide search results.

A database includes a corpus of information used to supplement search results lists, search indices themselves, and any combination of these: data that users of a search find useful, a record of data entered by users of the search, such as by saving, rating, blocking, writing, editing, or deleting data. The database is spread among one or more data stores and systems. Also, as described below, the database is able to be managed in response to user inputs.

In accordance with other embodiments of the disclosed subject matter, search results also include selected items for display including, but not limited to, (1) mechanisms for providing feedback on the relevance of links in the results list, (2) mechanisms for saving links that are able to be displayed on personal search pages or voting for relevant links, and (3) mechanisms for "blocking" links to Web pages that are unrelated to the search result or are offensive in nature. Other embodiments include displays and links to related search terms and sponsored links.

Throughout the following description, the term "search engine" refers to an apparatus (or programs running on general purpose computers) that take as input a query and return a results list of hyperlinks to electronic documents or Web pages. The search engine includes the index of documents in its corpus, the code and algorithms that determine the relevance of each document, and the graphical user interface that delivers the results list to the user.

Throughout the following description the term "query" refers to a set of terms submitted to the search engine whether typed, spoken, submitted through a "link" that already has embedded a set of search terms, or submitted by any other interface. A query can comprise a single word, multiple words, or phrases. The query can be phrased as a question (e.g., a "natural language" query), a loose set of terms, or a structured Boolean expression. Indeed, a query can comprise symbols or any other characters used by a search engine to search for electronic documents or Web pages containing or related to the search characters.

Throughout the following description, the term "Web site" refers to a collection of Web pages that are linked together and are available on the World Wide Web. The term "Web page" refers to a publication accessible over the World Wide Web from any number of hosts and includes, but is not limited to, text, video, images, music, and graphics.

Throughout the following description, the term "results list" refers to a list of hyperlinks that reference documents or Web Pages that are accessible using the Hypertext Transfer Protocol (HTTP) or any other protocol for accessing Web pages or other electronic documents, along with other associated information for each link, including, but not limited to, titles of the documents, summaries of the documents, links to cached copies of the documents, the date on which the documents were last indexed or last modified, images associated with or located within the documents, and information extracted from the documents.

As used herein, the term "document" is defined broadly, and includes, in addition to its ordinary meaning, computer files and Web pages, whether those pages are actually stored or are generated dynamically in response to a request to display. The term "document" is not limited to computer files containing text, but also includes computer files containing graphics, audio, video, and other multimedia data.

As described in greater detail below, a search engine takes a query entered by a user, and matches the search terms against an index of Web pages using a variety of relevance calculations with the objective of identifying those Web pages that are most likely related to the information sought by the users. The search engine then returns a ranked list of hyperlinks to these Web pages, with the links thought to be most relevant nearer the top of the list. In accordance with aspects of the disclosed subject matter, a search engine returns a results list based on user input, and users have the ability to input information into the system to, for example, affect the order of the documents or links listed in the results list.

In accordance with aspects of the disclosed subject matter, when a user is delivered a page containing a results list, he can choose to add supplemental information to the page, which will be visible to other users who subsequently access the search engine by entering a query which is the same, or similar.

Figure 1:
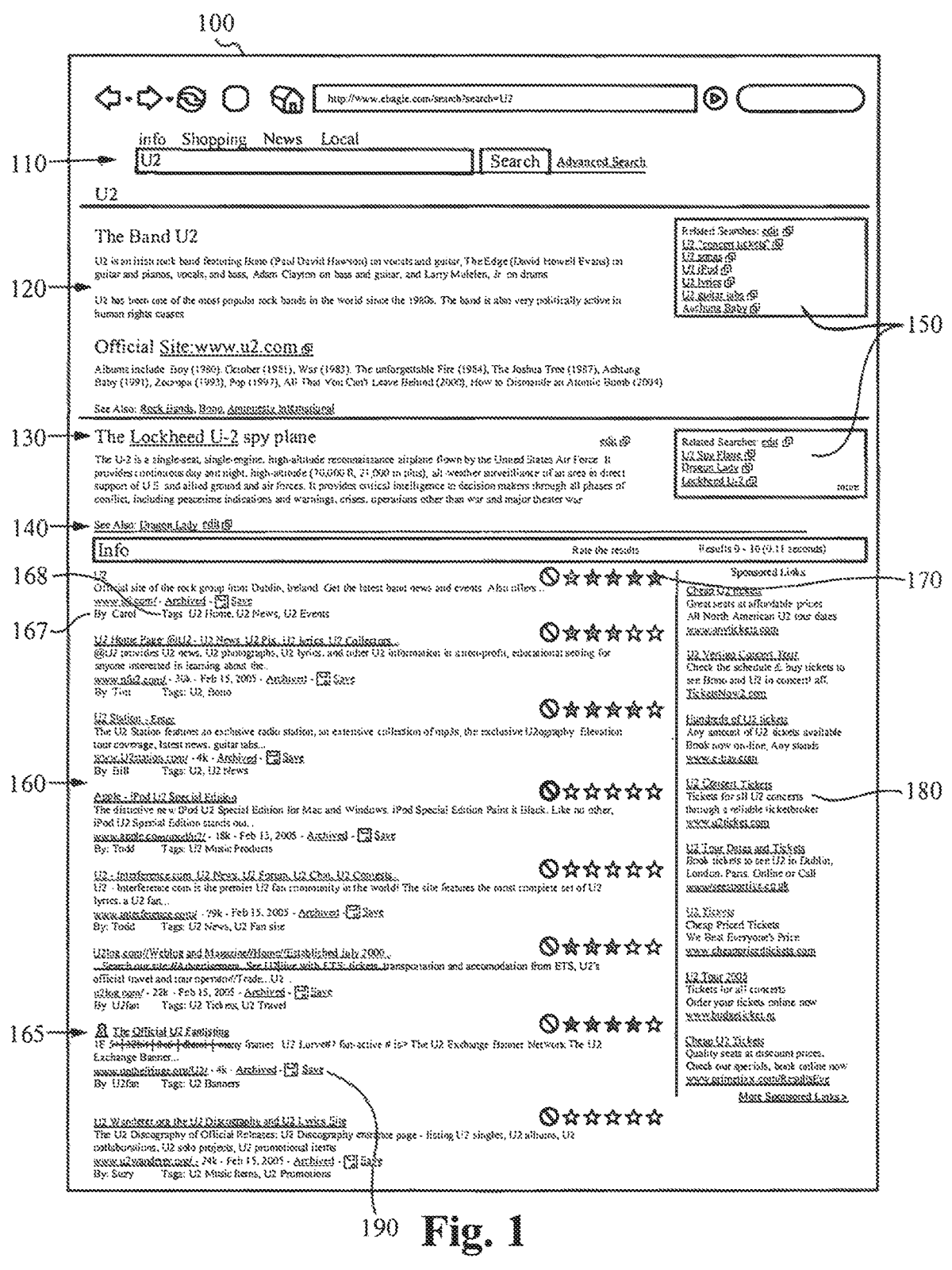

FIG. 1 is a schematic illustration of a representative graphical user interface (GUI) displaying a results page 100 returned in response to a query in accordance with aspects of the disclosed subject matter. The GUI allows users to add, edit and view descriptions about the concept or concepts relating to a query term and add, edit and view advice on how to search for information about the concept.

The results page 100 comprises a box 110 for inserting a query term, an area 120 for displaying a description for a concept related to the query term, an area 130 containing a description of a different concept relating to the query term, an area 140 containing "See also" links to concepts relating to other query terms, and an area 150 containing a list of links which will cause related query terms to be executed, and an area 180 of sponsored links. The results page 100 also includes an area 160 containing the results list returned by the search engine. The area 160 also contains mechanisms 170 for entering user feedback and mechanisms 190 for saving links associated with each result returned by the search engine. As described in more detail below, in a preferred embodiment the areas 120, 130, 140 and 150 are able to be edited, added to, or otherwise modified by a user to display information presented to other users performing the same or similar queries.

As shown in the example of FIG. 1, when a user enters the query term "U2" in the box 110 and requests a search, the results page 100 is returned to him. The area 120 displays a description of one concept related to the query term "U2", here a description of the band "U2", as entered by users. The area 130 shows descriptions of a different concept for the query "U2", here the U2 spy plane, as entered by users. The area 150 displays query terms for related searches that the user may also be interested in having the search engine execute, such as "U2 concert tickets" or "U2 iPod", as entered by users or derived by algorithms. The area 140 contains "see also" hyperlinks to concepts relating to other query terms, as entered by users or derived by algorithms, such as "Bono" for the concept of "U2 the band" or "Dragon Lady" for the concept of "U2 the spy plane."

The area 160 contains the results of the search as well as user feedback mechanisms 170. Using the user feedback mechanisms 170, a user is able to rate how well the corresponding Web page matched what he was looking for. In other words, if a first Web page listed in the area 160 contained relevant information about the rock band U2 sought by the user, then the user is able to use the user feedback mechanism 170 to rate the link with a high score (e.g., 5 stars). A second Web page devoted to the name of a clothing line called "U2", irrelevant to the concept sought by the user but listed in the area 160, can be rated with a low score (e.g., 1 star). In accordance with aspects of the disclosed subject matter, when a later user also interested in the band "U2" searches with the query "U2", the results list returned to him contains the first Web page (ranked with 5 stars) closer to the top of the results list and the second Web page (ranked with 1 star) closer to the bottom of the results list, or not even listed at all. In this way, a user is presented with a results list having only the most relevant results listed first. A user sequentially visiting the sites in the results list has a greater chance of viewing sites most relevant to the concept he is seeking. The order of the items in the results list is thus based on user feedback, in addition to meta data and other information over which users have no input.

Users are able to add descriptions 120 about a concept relating to a query term, providing some background information about the concept referred to by the query or advice on how to search for information about that concept. Users are also able to modify, enhance or remove descriptions about the concept relating to a query term that have previously been added or modified by themselves or other users.

Users are able to add descriptions of additional concepts relating to a search term, even if other concepts have already been entered. For example, for the query term "star wars" a description of the concept of the movie "Star Wars" is able to be added, including such information as the plot, actors, and producer. Subsequently, users are able to click on a link 130, which allows them to add a description relating to the same query term "star wars", describing a different concept, for example "Strategic Defense Initiative or SDI."

In alternative embodiments, concepts added, modified, or deleted in accordance with aspects of the disclosed subject matter are sub-categories (e.g., sub-topics) of one another, co-occur in documents, or occur in a statistically-related manner. For example, the concepts "Operating System" and "Linux" are a topic and a related sub-topic. Also, in alternative embodiments, concepts are determined to be related from pre-determined criteria, user-entered categories, and statistical calculations (e.g., how often the concepts appear together in a document).

Users are able to add hyperlinks or "see also" references 140 linking to concepts relating to different query terms. As one example, a user adds to the "See also" section of the concept of Star Wars the movie, a hyperlink to the concept of George Lucas the writer/producer for the query term "George Lucas". Users are able to modify, add, or delete "See also" references. Users are able to add suggested queries for a concept that when clicked on, causes the query to be submitted to a search engine that returns a results page 100 containing a results list 160, with associated supplemental information 120, 140, and 150.

The search engine is also able to generate suggested query terms using a computer algorithm. For example, one such computer algorithm searches documents to determine terms that often appear in the same document (co-occur), within a predetermined distance from one another, or with a predetermined density (i.e., occur at least a pre-determined number of times). The algorithm thus determines that the terms are related, and the search engine offers the query terms as suggestions. Alternatively, the computer algorithm keeps a list of query terms, such as synonyms or word variations, which are also suggested to the user.

Users are able to add or save links to documents they consider to be highly relevant to the concept. This can be done by manually entering the links or by clicking on a hyperlink or icon 190 marked "Save" or referred to by other terms such as "Bookmark", "Tag", or "Add to Favorites." Since different users will have different ideas about which sites are most relevant, algorithms in accordance with aspects of the disclosed subject matter determine the order of the sites listed. In one embodiment, the algorithm uses a "democratic" process, such that the documents receiving the most "votes" (e.g., "saved" by the largest number of users) are placed higher in the results list.

If the link to a document that is "saved" also shows up in the results list generated by the search engine, then an icon 165 can be used to show that this link is also one that has been voted for by users. Also, below each search result is a "By" entry 167, which shows the name of the user who added the link so that it could be returned as part of the results list, and a "Tags" entry 168, which lists the terms that the user tagged the link with or that were generated by a previous search.

In accordance with aspects of the disclosed subject matter, links to Web sites are able to be listed in two ways, either as two separate lists: (1) the results list (algorithmic) and the user-entered links or (2) integrated into one list, with the user-entered links marked with an icon as described above.

Two or more people are able to modify any of the information described herein. As one example, a first user writes, and a second user modifies the work of the first. The first is able to either "revert" or re-edit the work of the second. If two or more people disagree about what information should be entered, they can communicate by some other means (e.g., a discussion forum, email, instant messenger) in order to resolve the conflict and agree on what the entry should say.

If any two or more users are unable to resolve their disagreement about what should be entered, they are able to take their differences to an "editor" who can resolve the disagreement. The "editor" is responsible for a number of subject areas and has the authority to settle disputes, add or remove information, and ultimately to remove users who refuse to cooperate.

If a user enters information that others revert repeatedly, it can be assumed that the user is not entering information that people want to have posted. For example, the user may be defacing or vandalizing the information in the subject area. A rule is able to be enforced that requires users who have had their entries reverted a predetermined number of times within a certain time period be suspended for some predetermined period of time. This rule is intended to reduce the amount of vandalism.

Users are able to enter any kind of information, beyond any of the specific types of information suggested here. As one example, for all actors, a link to their page at the Internet Movie Database (www.imdb.com) is entered. Or for cities, a link to the Weather.com page showing current temperature and weather conditions is entered. Or for a song, links to sites that sell the song, the lyrics, other songs by the artist, or even sites that plays some or all of the song are entered.

It will be appreciated that many modifications can be made in accordance aspects of the disclosed subject matter. For example, user-generated feedback can be read from a file rather than input by a user directly from a terminal. Moreover, while the results page 100 shows areas such as "See also" links 140, it will be appreciated that in accordance aspects of the disclosed subject matter, results pages containing user-entered information can be displayed with any combination of areas, including or in addition to those shown in FIG. 1. This information is used to make search results more comprehensive, accurate, and meaningful.

FIG. 2 is a flow diagram illustrating the operation of an Internet search application 200 in accordance with one embodiment of the disclosed subject matter. The Internet search application 200 provides the ability for users to input information to the system, thereby allowing other users to receive more meaningful search results based on the user input. The information is used to rank documents in a results list (e.g., re-rank the results initially returned by a search engine) generated in response to a specific query, or to add information that may be useful to users who perform the same or similar search. The results list is thus able to be "tuned" in response to user feedback to return more meaningful results, as well as to return additional information related to the subject matter of the query.

In the step 205, the user submits a query to a search engine. The process then continues to the steps 210 and 220 which are able to be performed simultaneously. In the step 210, the search results list is calculated, and in the step 220 the supplemental information (e.g., areas 120, 130, 140 and 150, FIG. 1) is retrieved. Both steps 210 and 220 proceed to the step 230, in which the results page (e.g., 100, FIG. 1) is sent to the user. The step 230 proceeds to any one of the steps 240, 250, 260, and 270.

In the step 240, the user is allowed to add to or edit the supplemental information (e.g., areas 120, 130, 140 or 150, FIG. 1). Alternatively, in the step 250, the user is able to click on a suggested search link (e.g., area 130, FIG. 1); or in the step 260, click on a "See also" link (e.g., area 140, FIG. 1); or in the step 270, visit a Web site (e.g., follow one of the links in area 150, FIG. 1). The step 240 loops back to the step 230, and the steps 250, 260, and optionally 270, all loop back 280 to the step 205. Alternatively, from the step 270, the user is able to proceed to the step 290, where the query completes.

Figure 3:
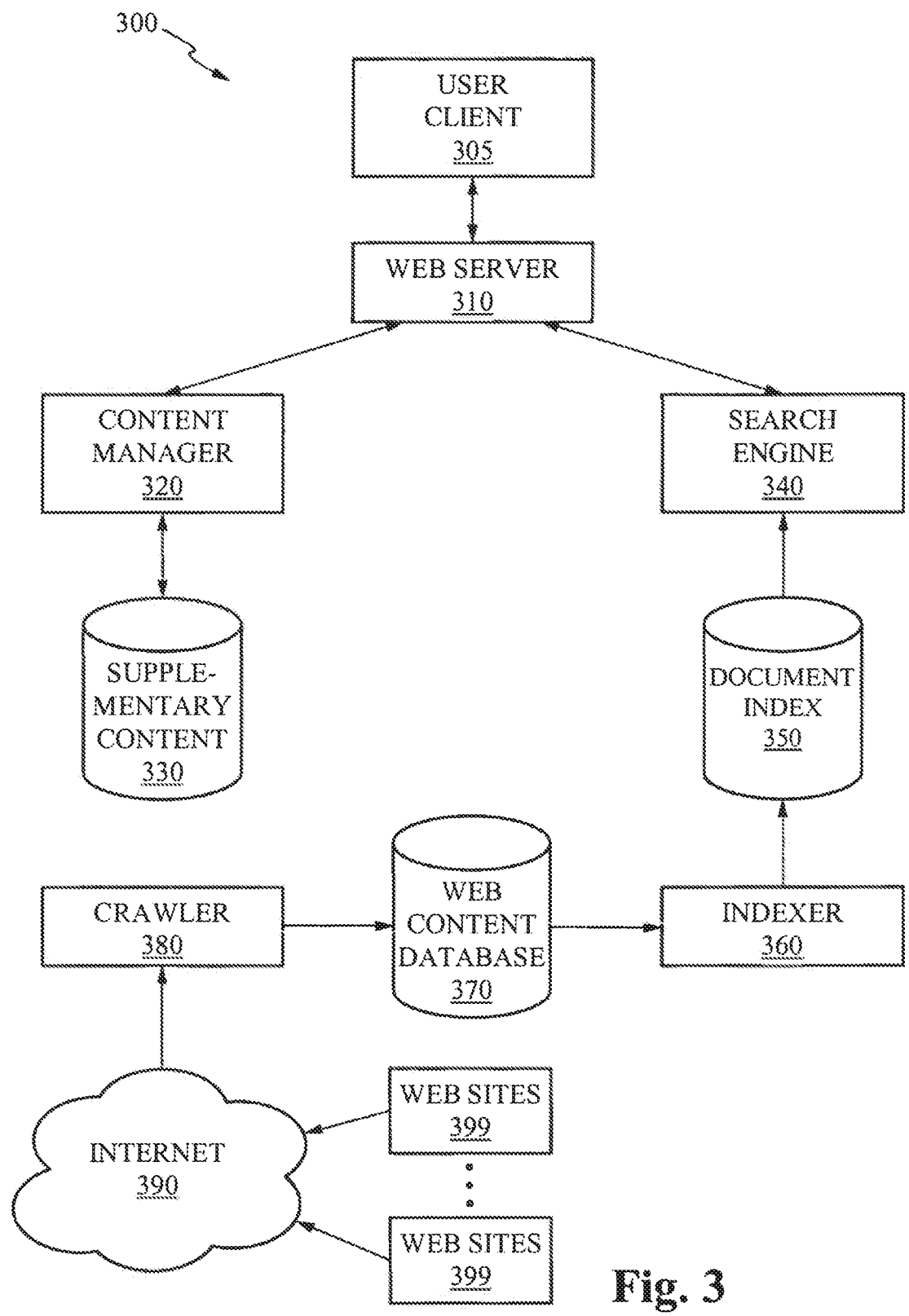
FIG. 3 is a schematic diagram illustrating the components of an Internet search application flow diagram in accordance with aspects of the disclosed subject matter.

FIG. 3 illustrates the components of a system 300 in accordance with aspects of the disclosed subject matter. The system 300 comprises a user client 305 that connects to a Web server 310. The Web server 310 is coupled to both a content manager 320 and a search engine 340. The content manager 320 is coupled to a data repository 330 for storing supplemental content. The search engine 340 is coupled to a data repository 350 containing document indices, which in turn is coupled to an indexer 360. The indexer 360 is coupled to a Web content database 370, which is coupled to a Web crawler 380. The Web crawler 380 is coupled to one or more Web sites 399 over the Internet 390.

In operation, the Web crawler 380 navigates over the Internet 390, visiting Web sites 399 and populating the Web content database 370. The indexer 360 uses the Web content database 370 to create the document index 350. When a user generates a query on the user host 305, the Web server 310 transmits the search request to the search engine 340. The search engine 340 determines which Web pages are probably most relevant to the query and, using the user generated feedback described above, creates the results list. The search engine 340 uses the user generated rankings to order the results list, as described above, and returns the results list to the user for display.

Also in response to the query, the content manager 320 retrieves supplemental information related to the query from the data repository 330, including concept descriptions, other concept descriptions, "See also" links and related query terms. This information is displayed, for example, in areas 120, 130, 140 and 150, respectively, of FIG. 1. The content manager 320 also allows users to add, edit, or remove supplemental information. The Web server 310 combines the results from the search engine 340 with the information from the content manager 320 and returns the combination to the user. The content manager 320 determines whether the user changed supplemental information and, if so, stores it in the data repository 330. The new or updated information is now available to a later user running the same or similar search.

Figure 4:
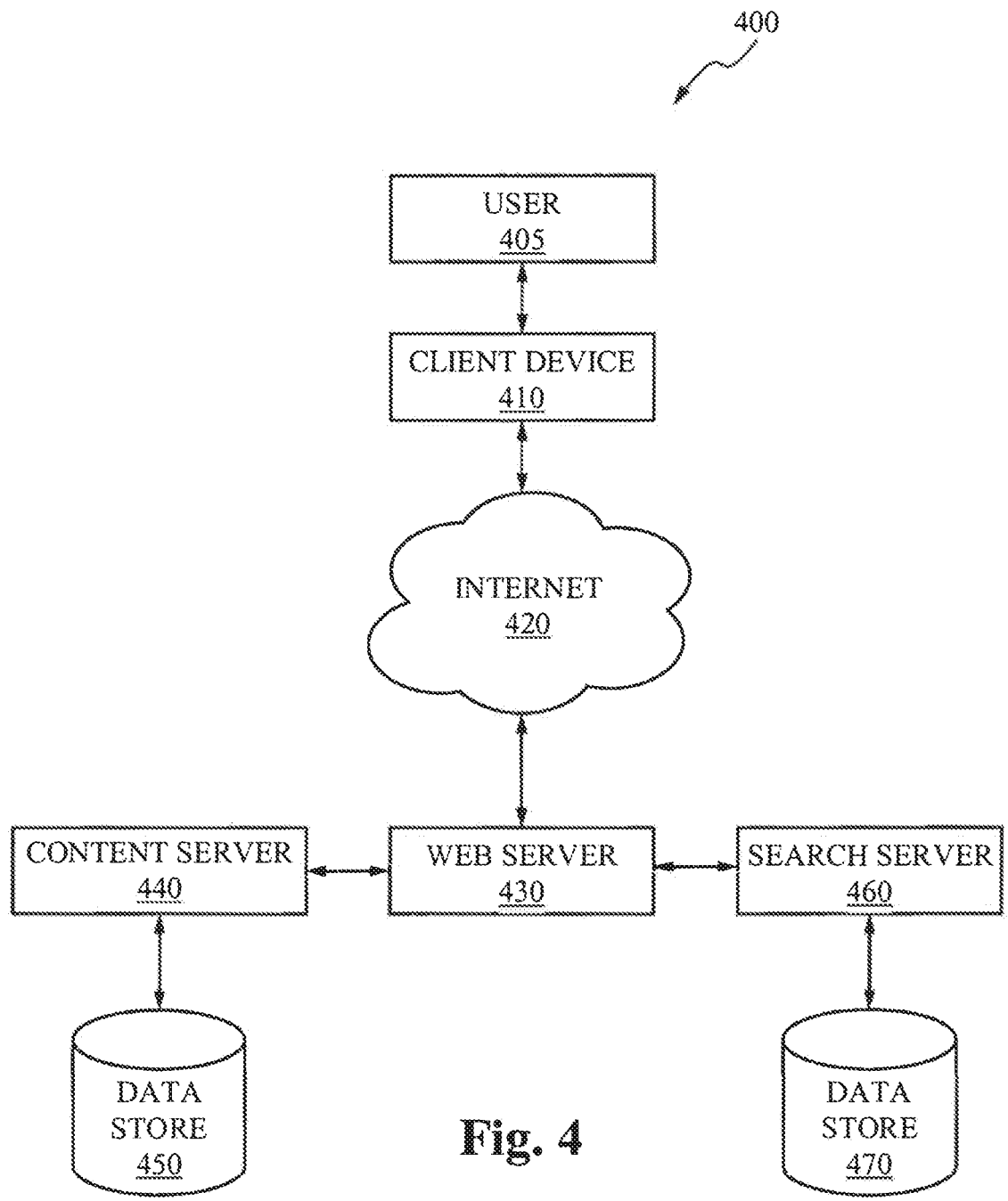
FIG. 4 is a hardware diagram illustrating the components of an Internet search application in accordance with aspects of the disclosed subject matter.

FIG. 4 illustrates the hardware components for an Internet search application system 400 for use by a user 405 in accordance with aspects of the disclosed subject matter. The system 400 comprises a client device 410 coupled over the Internet 420 to a Web server 430. The client device 410 is any device used to access the Web server 430 and configured to communicate using Internet protocols such as, but not limited to, http (the Hypertext Transfer Protocol) and WAP (Wireless Application Protocol). Preferably, the client device 410 is a personal computer. Alternatively, the client device 410 is another device including, but not limited to, a hand-held device such as a cell phone or personal digital assistant (PDA) capable of presenting information using standards such as HTML (the Hypertext Markup Language), HDML (Handheld Device Markup Language), WML (wireless markup language), or the like.

The Web server 430 is coupled to both a content server 440 and a search server 460. The content server 440 is coupled to a data store 450 and the search server 460 is coupled to a data store 470.

It will be readily apparent to one skilled in the art that other modification can be made to the embodiments without departing from the spirit and scope of the invention as defined by the appended claims. Indeed, while various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computing system comprising:
   at least one processor; and
   a memory storing program instructions that, when executed by the at least one processor, cause the at least one processor to at least:
   determine, in response to a first search query relating to a first concept, a plurality of first search results and a plurality of first supplemental information corresponding to the first concept;
   cause a first search results page to be presented in response to the first search query, wherein the first search results page includes at least a portion of the plurality of first search results and at least a portion of the plurality of first supplemental information;
   receive, via an interaction with the first search results page, user feedback regarding at least one of the plurality of first search results or at least one of the plurality of first supplemental information;

obtain, in response to a second search query relating to the first concept and based at least in part on the user feedback, a plurality of second search results and a plurality of second supplemental information corresponding to the first concept; and cause a second search results page to be presented in response to the second search query, wherein the second search results page includes at least a portion of the plurality of second search results and at least a portion of the plurality of second supplemental information.

2. The computing system of claim 1, wherein the program instructions that, when executed by the at least one processor, further cause the at least one processor to, at least:

determine, in response to the first query, a first plurality of query terms; and cause the first plurality of query terms to be presented.

3. The computing system of claim 2, wherein:

the plurality of first supplemental information includes the first plurality of query terms; and the first plurality of query terms are included in the first search results page.

4. The computing system of claim 1, wherein the program instructions that, when executed by the at least one processor, further cause the at least one processor to, at least:

determine, in response to the second query, a second plurality of query terms; and cause the second plurality of query terms to be presented.

5. The computing system of claim 4, wherein:

the plurality of second supplemental information includes the second plurality of query terms; and the second plurality of query terms are included in the second search results page.

6. The computing system of claim 1, wherein the program instructions that, when executed by the at least one processor, further cause the at least one processor to:

receive, via a second interaction with the first search results page, an indication to save a first search result from the plurality of first search results.

7. A computer-implemented method, comprising:

determining, in response to a first search query relating to a first concept, a first plurality of search results and a first plurality of supplemental information;

causing a first search results page to be presented in response to the first search query, wherein the first search results page includes at least a portion of the first plurality of search results and at least a portion of the first plurality of supplemental information;

receiving, via an interaction with the first search results page, user feedback regarding at least one of the first plurality of search results or the first plurality of supplemental information;

determining, in response to a second search query relating to the first concept and based at least in part on the user feedback, a second plurality of search results and a second plurality of supplemental information; and causing a second search results page to be presented in response to the second search query, wherein the second search results page includes at least a portion of the second plurality of search results and at least a portion of the second plurality of supplemental information.

8. The computer-implemented method of claim 7, further comprising:

determining, in response to a second search query relating to the first concept and based at least in part on the user feedback, a second plurality of search results and a second plurality of supplemental information; and causing a second search results page to be presented in response to the second search query, wherein the second search results page includes at least a portion of the second plurality of search results and at least a portion of the second plurality of supplemental information.

9. The computer-implemented method of claim 7, wherein the first plurality of supplemental information includes user-supplied information relating to the first concept.

10. The computer-implemented method of claim 7, further comprising:

determining, in response to the first query, a first plurality of query terms; and causing the first plurality of query terms to be presented.

11. The computer-implemented method of claim 10, wherein:

the first plurality of supplemental information includes the first plurality of query terms; and the first plurality of query terms are included in the first search results page.

12. The computer-implemented method of claim 10, wherein the first plurality of query terms includes user-supplied queries related to the first concept.

13. The computer-implemented method of claim 7, further comprising:

receiving, via a second interaction with the first search results page, an indication to save a first search result from the first plurality of search results.

14. The computer-implemented method of claim 7, wherein the plurality of first supplemental information is presented separately from and independently from the first plurality of search results.

15. A computer-implemented method, comprising:

determining, in response to a first search query relating to a first topic, a first plurality of search results corresponding to the first topic, wherein the first plurality of search results includes a first results list and first supplemental information;

causing a first search results page to be presented in response to the first search query, wherein the first search results page includes at least a portion of the first plurality of search results;

obtaining, via an interaction with the first search results page, user feedback regarding the first plurality of search results presented on the first search results page;

determining, in response to a second search query relating to the first topic and based at least in part on the user feedback, a second plurality of search results corresponding to the first topic, wherein the second plurality of search results includes a second results list and second supplemental information; and causing a second search results page to be presented in response to the second search query, wherein the second search results page includes at least a portion of the second plurality of search results.

16. The computer-implemented method of claim 15, further comprising:

determining, in response to the first search query, a first plurality of query terms; and causing the first plurality of query terms to be presented.

17. The computer-implemented method of claim 16, wherein:

the first supplemental information includes the first plurality of query terms; and the first plurality of query terms are included in the first search results page.

18. The computer-implemented method of claim 16, wherein the first plurality of query terms includes user-supplied queries related to the first topic.

19. The computer-implemented method of claim 15, further comprising:
   receiving, via a second interaction with the first search results page, an indication to save a first search result from the first plurality of search results.

20. The computer-implemented method of claim 15, wherein the first supplemental information includes user-supplied information relating to the first topic.

\* \* \* \* \*